United States Patent [19]

Sasaki et al.

[11] Patent Number: 4,955,339
[45] Date of Patent: Sep. 11, 1990

[54] INTERNAL COMBUSTION ENGINE

[75] Inventors: Shizuo Sasaki, Susono; Yoshiyuki Tamaki, Mishima, both of Japan

[73] Assignee: Toyota Jidosha Kabushiki Kaisha, Japan

[21] Appl. No.: 438,698

[22] Filed: Nov. 17, 1989

[30] Foreign Application Priority Data

Nov. 18, 1988 [JP] Japan ............................... 63-290200
Dec. 23, 1988 [JP] Japan ............................... 63-323604

[51] Int. Cl.$^5$ .................. F02B 17/00; F02D 41/40; F02M 51/00
[52] U.S. Cl. .................. 123/295; 123/300; 123/305; 123/276; 123/478
[58] Field of Search ............... 123/498, 478, 480, 276, 123/279, 295, 299, 300, 305

[56] References Cited

U.S. PATENT DOCUMENTS

| | | | |
|---|---|---|---|
| 3,924,598 | 12/1975 | Davis | 123/299 |
| 4,363,307 | 12/1982 | Amano et al. | 123/480 |
| 4,414,940 | 11/1983 | Loyd | 123/300 |
| 4,478,190 | 10/1984 | Kawai | 123/480 |
| 4,480,620 | 11/1984 | Tange et al. | 123/478 |
| 4,492,193 | 1/1985 | Neitz | 123/276 |
| 4,492,194 | 1/1985 | Chmeh et al. | 123/276 |
| 4,501,239 | 2/1985 | Bauer et al. | 123/276 |
| 4,621,599 | 11/1986 | Igashira et al. | 123/300 |
| 4,691,674 | 9/1987 | Otsuka et al. | 123/299 |
| 4,785,784 | 11/1988 | Nanyoshi et al. | 123/480 |

FOREIGN PATENT DOCUMENTS

| | | |
|---|---|---|
| 49-62807 | 6/1974 | Japan. |
| 60-30420 | 2/1985 | Japan. |
| 61-250361 | 11/1986 | Japan. |
| 62-162721 | 7/1987 | Japan. |
| 62-191622 | 8/1987 | Japan. |

Primary Examiner—Tony M. Argenbright
Assistant Examiner—Robert E. Mates
Attorney, Agent, or Firm—Kenyon & Kenyon

[57] ABSTRACT

An internal combustion engine comprising a fuel injector for injecting fuel directly into a cylinder and a calculating device for calculating a calculated amount of fuel to be injected on the basis of an engine operating state. The fuel injector injects all of the calculated amount of fuel during a compression stroke when the calculated amount of fuel is smaller than a predetermined first amount of fuel, and injects a part of the calculated amount of fuel during an approximately first half of an intake stroke and injects a remaining part of the calculated amount of fuel during a compression stroke when the calculated amount of fuel is equal to or larger than a predetermined second amount of fuel which is larger than the predetermined first amount of fuel.

31 Claims, 17 Drawing Sheets

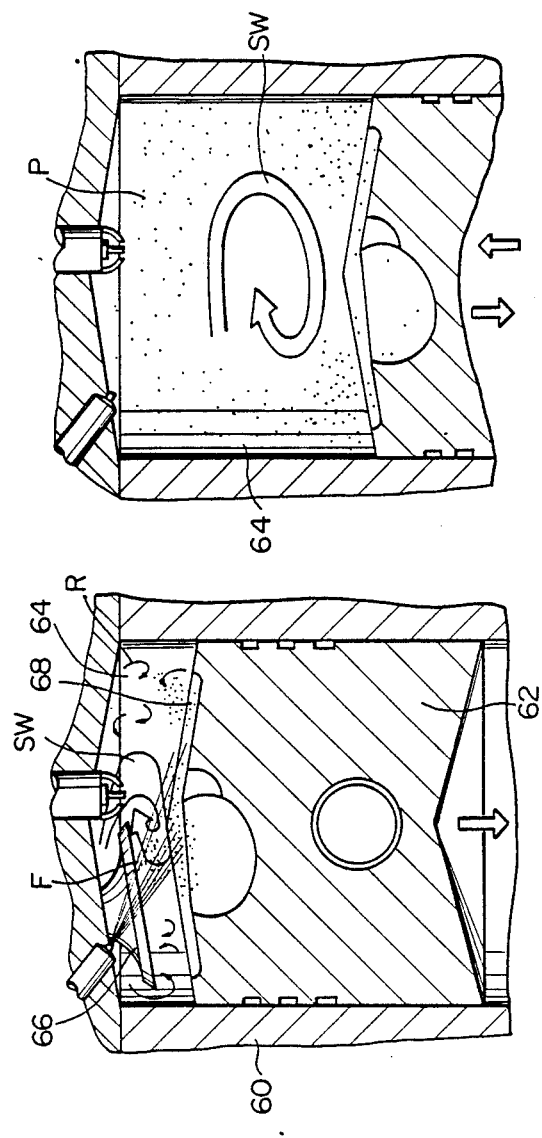

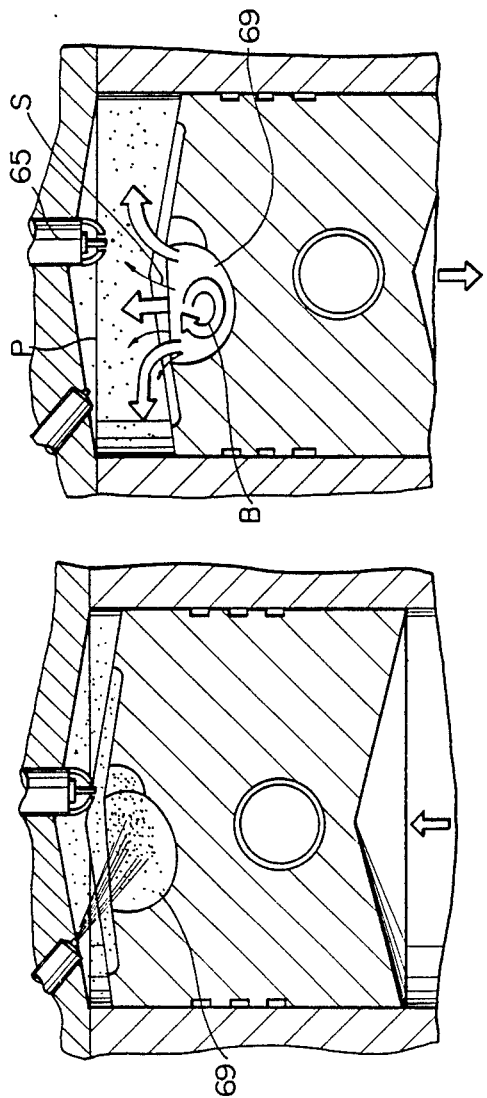

INTERNAL COMBUSTION ENGINE

BACKGROUND OF THE INVENTION

1. Field of the Invention

The present invention relates to an internal combustion engine.

2. Description of the Related Art

Japanese Unexamined Patent Publication No. 62-191622 discloses an internal combustion engine having a fuel injector for injecting fuel directly into a cylinder. In this engine, an entire amount of fuel to be injected is injected during a latter half of a compression stroke when the engine is operating under low and medium loads, and a part of the amount of fuel to be injected is injected before and after bottom dead center (BDC) of an intake stroke, and the remaining part is injected during the latter half of the compression stroke, when the engine is operating under a high load. Namely, when the engine is operating under a high load, a prior injection is carried out before and after the BDC of an intake stroke and a subsequent injection is carried out during the latter half of the compression stroke.

When the engine is operating under a high load, however, since the prior injection is carried out from approximately the end of the intake stroke to approximately the beginning of the compression stroke, the period from a timing of the prior injection to a timing of an ignition is short, and therefore, fuel injected during the prior injection is not fully evaporated and not completely mixed with the air, and thus a problem arises in that a good combustion and a sufficient engine power can not be obtained.

SUMMARY OF THE INVENTION

An object of the present invention is to provide an internal combustion engine wherein a good ignition and a good combustion are obtained.

According to the present invention, there is provided an internal combustion engine having a piston introduced into a cylinder and a spark plug arranged in a cylinder head, the engine comprising: a fuel injector for injecting fuel directly into the cylinder; detecting means for detecting an engine operating state; calculating means for calculating a calculated amount of fuel to be injected on the basis of the engine operating state detected by said detecting means; and a control means for controlling the fuel injector to inject an entire amount of said calculated amount of fuel during a compression stroke when the calculated amount of fuel is smaller than a predetermined first amount of fuel, to inject a part of the calculated amount of fuel during approximately a first half of an intake stroke of the piston and inject a remaining part of the calculated amount of fuel during a compression stroke of the piston when the calculated amount of fuel is equal to or larger than the predetermined first amount of fuel and smaller than a predetermined second amount of fuel which is larger than the predetermined first amount of fuel.

The present invention may be more fully understood from the description of preferred embodiments of the invention set forth below, together with the accompanying drawings.

BRIEF DESCRIPTION OF THE DRAWINGS

In the drawings:

FIGS. 16(a–d) are a diagram illustrating an operation of the second embodiment;

FIGS. 21, 21a and 21b are a flow chart of a seventh embodiment of the present invention, for controlling the fuel injection;

DESCRIPTION OF THE PREFERRED EMBODIMENTS

Figure 1:
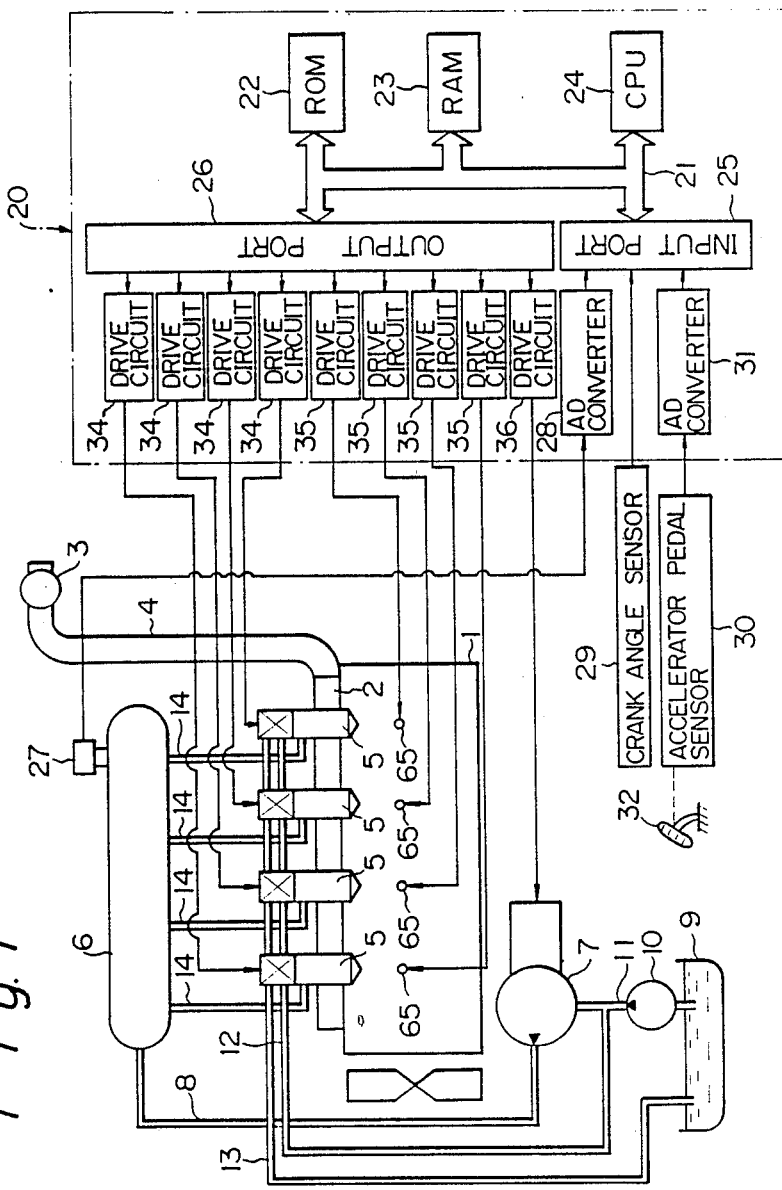
FIG. 1 is a schematic view of a four-cylinder gasoline engine.

Referring to FIG. 1, reference numeral 1 designates an engine body, 2 a surge tank, 3 an air cleaner, 4 an intake pipe, 5 fuel injectors, 65 spark plugs, and 6 a reservoir tank. The intake pipe 4 connects the surge tank 2 to the air cleaner 3, and a low pressure fuel pump 10 supplies fuel from a fuel tank 9 to a high pressure fuel pump 7 via a conduit 11. The high pressure fuel pump 7 supplies a high pressure fuel to the reservoir tank 6 via a high pressure conduit 8. The conduit 11 is connected to a cooling pipe 12 for cooling the piezoelectric elements of each fuel injector 5, and the cooling pipe 12 is connected to the fuel tank 9 via a return pipe 13. Each fuel supply pipe 14 connects each fuel injector 5 to the reservoir tank 6.

The electronic control unit 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected via a bidirectional bus 21. A pressure sensor 27 for detecting a pressure in the reservoir tank 6 is connected to the input port 25 via an AD converter 28. A crank angle sensor 29 generates a pulse at predetermined crank angles, and the pulses output by the crank angle sensor 29 are input to the input port 25, and accordingly, an engine speed is calculated on the basis of the pulses output by the crank angle sensor 29. An accelerator pedal sensor 30 for detecting a degree of opening $\theta A$ of an accelerator pedal 32 is connected to the input port 25 via an AD converter 31.

Each fuel injector 5 is connected to the output port 26 via corresponding drive circuits 34, each spark plug 65 is connected to the output port 26 via corresponding drive circuits 35, and the high pressure fuel pump 7 is connected to the output port 26 via a drive circuit 36.

Figure 2:
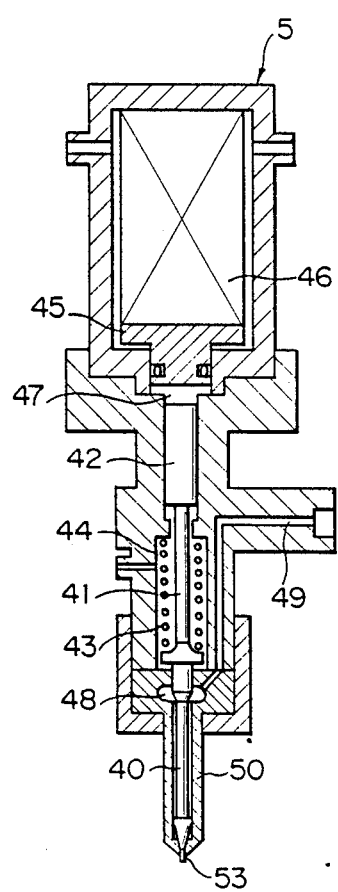
FIG. 2 is a cross-sectional side view of a fuel injector.

FIG. 2 illustrates the fuel injector 5. Referring to FIG. 2, reference numeral 40 designates a needle inserted into a nozzle 50, 41 a rod, 42 a movable plunger, 45 a pressure piston, 46 a piezoelectric element, and 48 a needle pressure chamber. A compression spring 43 is arranged in a spring space 44 and urges the needle 40 downward. A pressure chamber 47 is defined by the top of the movable plunger 42 and the bottom of the pressure piston 45, and is filled with fuel. The needle pressure chamber 48 is connected to the reservoir tank 6 (FIG. 1) via a fuel passage 49 and the fuel supply pipe 14 (FIG. 1), and accordingly, high pressure fuel in the reservoir tank 6 is supplied to the fuel chamber 48 via the fuel supply pipe 14 and the fuel passage 49. When a charge is given to the piezoelectric element 46 to stop the fuel injection, the piezoelectric element 46 expands axially, and as a result, the pressure piston 45 is moved downward in FIG. 2, and thus the fuel pressure in the pressure chamber 47 is rapidly increased. When the fuel pressure in the pressure chamber 47 is increased, the movable plunger 42 is moved downward in FIG. 2, and therefore, the needle is also moved downward and closes a nozzle opening 53.

On the other hand, when the charge of the piezoelectric element 46 is discharged to start the fuel injection, the piezoelectric element 46 is contracted, and as a result, the pressure piston 45 is moved upward in FIG. 2, and thus the fuel pressure in the pressure chamber 47 is reduced. When the fuel pressure in the pressure chamber 47 is reduced, the movable plunger 42 is moved upward in FIG. 2, and therefore, the needle is also moved upward and opens the nozzle opening 53.

Figure 3:
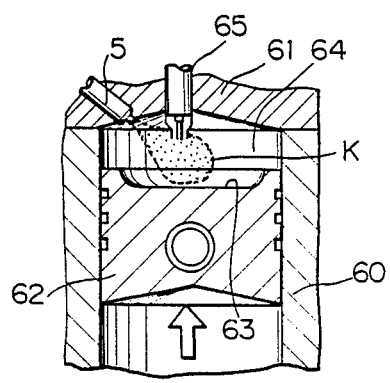
FIG. 3 is a cross-sectional side view of an engine to which a first embodiment of the present invention is applied.

FIG. 3 illustrates an engine to which a first embodiment of the present invention is applied. Referring to FIG. 3, reference numeral 60 designates a cylinder block, 61 a cylinder head, and 62 a piston. A cylindrical cavity 63 is formed at the center of the top of the piston 62, and a cylinder chamber 64 is defined between the top of the piston 62 and the bottom of the cylinder head 61. The spark plug 65 is arranged at approximately the center of the cylinder head 61. Although not shown in the drawing, an intake port and an exhaust port are formed in the cylinder head 61, and an intake valve 66 (see FIG. 5(a)) and an exhaust valve are arranged respectively at each opening of the intake port and the exhaust port to the cylinder chamber 64. The fuel injector 5 is a swirl type injector, and therefore, an atomized fuel injected from the fuel injector 5 has a wide spread angle and the speed of the injected fuel, which is along the direction of the injection, is relatively slow. The fuel injector 5 is arranged at the top of the cylinder chamber 64, inclined downwardly, so as to inject fuel to the vicinity of the spark plug 65. Furthermore the direction of the fuel injection and the fuel injection timing of the fuel injector 5 are determined such that the fuel injected from the fuel injector 5 is directed to the cavity 63 formed at the top of the piston 62. An arrow shows a direction of movement of the piston 62.

Figure 4:
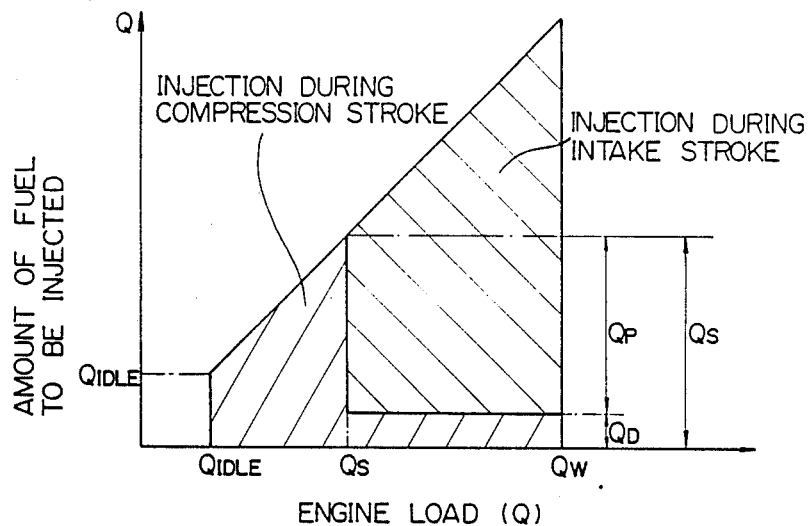
FIG. 4 is a diagram illustrating a control pattern of a fuel injection of the first embodiment.

FIG. 4 illustrates a control pattern of a fuel injection according to the first embodiment of the present invention. Referring to FIG. 4, the horizontal axis represents an engine load and the vertical axis represents an amount Q of fuel to be injected. As the engine load corresponds to the amount of fuel to be injected, in FIG. 4 the engine load is represented by the amount Q of fuel to be injected. The amount Q of fuel to be injected is calculated on the basis of an engine speed NE and a degree of opening $\theta A$ of the accelerator pedal 32. In FIG. 4, a predetermined first amount of fuel is equal to $Q_S$ and a predetermined second amount of fuel is equal to $Q_W$. $Q_S$, as calculated from the following equation, is an amount of fuel corresponding to a medium load.

$$Q_S = Q_D + Q_P$$

Where, $Q_D$ represents a first minimum amount of fuel to be injected during the compression stroke for forming an air-fuel mixture which can be ignited by the spark plug 65, and $Q_P$ represents a second minimum amount of fuel to be injected during the intake stroke for forming an air-fuel mixture in which a flame can be propagated even when the injected fuel is uniformly diffused in the cylinder chamber 64. The first minimum amount $Q_D$ of fuel for an ignition is considerably smaller than an amount $Q_{IDLE}$ of fuel for idling. $Q_W$ is an amount of fuel to be injected under a maximum load.

When the calculated amount of fuel to be injected is equal to or larger than the amount $Q_{IDLE}$ of fuel for idling and smaller than $Q_S$, all of the calculated amount of fuel is injected during a compression stroke. When the calculated amount of fuel is equal to or larger than $Q_S$ and smaller than or equal to $Q_W$, a part of the calculated amount of fuel is injected during the intake stroke and a remaining part of the calculated amount of fuel is injected during the compression stroke. Where, the intake stroke means a stroke from top dead center in an exhaust process to bottom dead center in an intake process, and the compression process means a stroke from bottom dead center in the intake process to top dead center in a compression process.

When the calculated amount of fuel is smaller than $Q_S$, an amount of fuel to be injected during the compression stroke increases in accordance with an increase of an engine load, i.e., the calculated amount of fuel to be injected. When the calculated amount of fuel is equal to or larger than $Q_S$, the amount of fuel to be injected during the compression stroke is constant at $Q_D$ and the amount of fuel to be injected during the intake stroke increases in accordance with an increase of an engine load.

Figure 5:
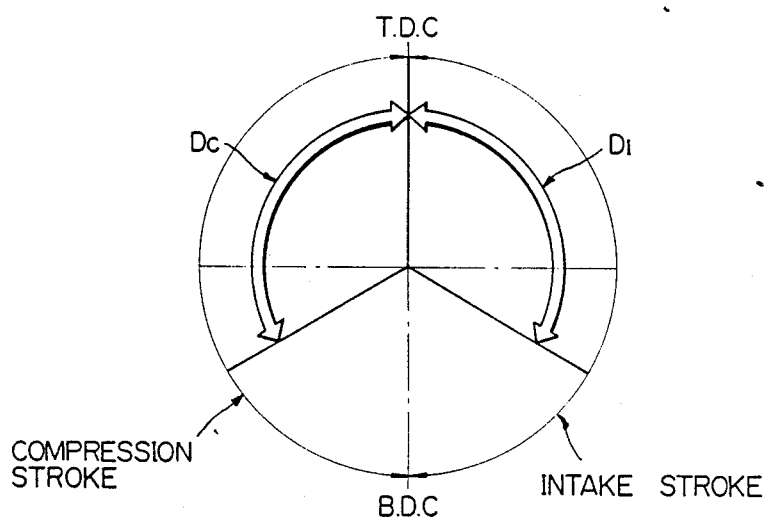
FIG. 5 is a diagram illustrating a fuel injection timing.

FIG. 5 illustrates a fuel injection period. Referring to FIG. 5, a fuel injection during the intake stroke is carried out within a period shown by $D_I$. This period $D_I$ corresponds to approximately a first half of the intake stroke. A fuel injection during the compression stroke is carried out within a period shown by $D_C$. The term $D_C$ corresponds to approximately a latter half of the compression stroke. The term $D_I$ and the term $D_C$ are symmetric with respect to the line connecting T.D.C and B.D.C in FIG. 5. As fuel is injected within the term $D_I$ or $D_C$, injected fuel does not directly impinge the inner face of the cylinder block 60, and therefore, little injected fuel adheres to the inner surface of the cylinder block 60.

When the calculated amount of fuel is smaller than $Q_S$, i.e., the engine load is low, fuel is injected from the fuel injector 5 during approximately the latter half of the compression stroke (FIG. 5) and directed toward the spark plug 65 and the cavity 63 at the top of the piston 62 shown in FIG. 3. Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the spark plug 65. As the distribution of fuel in the area K is not uniform and an air-fuel mixture formed in the area K has an air-fuel ratio of from rich to lean, an air-fuel mixture which has a stoichiometric air-fuel ratio and burns easily exists in the area K. Therefore an air-fuel mixture in the vicinity of the spark plug 65 can be ignited easily and the ignited flame propagated over the whole of the air-fuel mixture to complete the combustion. In this manner, when the engine is operating under a low load fuel is injected to the vicinity of the spark plug 65 during approximately the latter half of the compression stroke, and therefore, an inflammable air-fuel mixture is formed near the spark plug 65 and thus a good ignition and a good combustion is obtained.

Figures 6A, 6B, 6C, 6D:
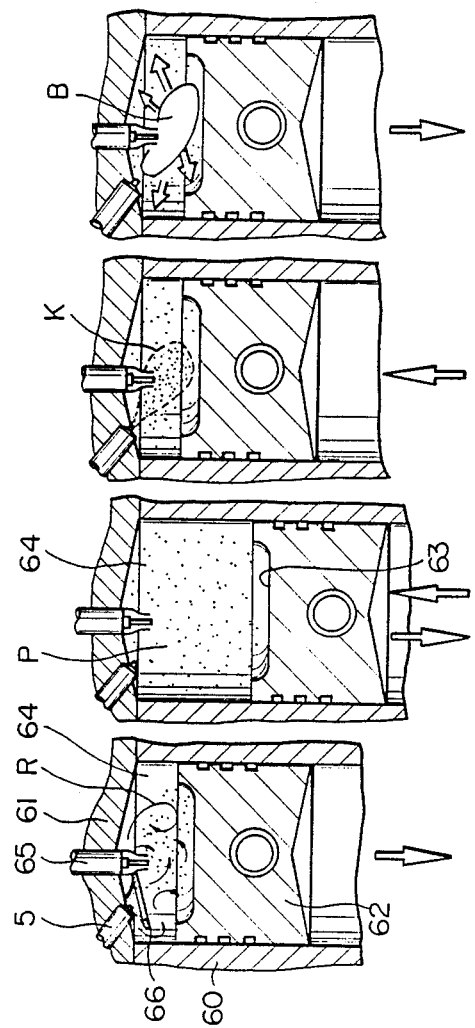
FIGS. 6(a–d) are a diagram illustrating an operation of the first embodiment.

When the calculated amount of fuel is equal to or larger than $Q_S$, a part of the calculated amount of fuel is injected from the fuel injector 5 to the spark plug 65 and the cavity 63 during approximately the first half of the intake stroke (FIG. 6(a)). The speed of the injected fuel along with the injection director is relatively slow and the injected fuel is atomized, and therefore, a part of the injected fuel floats in the cylinder chamber 64 and a remaining part of injected fuel impinges on the cavity 63. The injected fuel is diffused in the cylinder chamber 64 by the turbulent flow R caused by intake air flowing from the intake port and an air-fuel premixture P is formed in the cylinder chamber 64 (FIG. 6(b)). The air-fuel ratio of the air-fuel premixture P is such that a flame can be propagated. Fuel is injected during approximately the first half of the intake process (FIG. 5), and therefore, the injected fuel can be fully evaporated and fully diffused in the cylinder chamber to be completely mixed with the air therein.

Also, since fuel is not injected at approximately BDC the fuel injected from the fuel injector 5 does not directly impinge on the inner surface of the cylinder block 60, and thus little injected fuel is adhered to the inner surface of the cylinder block 60.

A remaining part of the calculated amount of fuel is injected from the fuel injector 5 to the spark plug 65 and the cavity 63 during approximately the latter half of the compression stroke (FIG. 5). Since the speed of the injected fuel along the injection direction is relatively slow, the pressure in the cylinder chamber 64 is high, and the flow of the gas in the cylinder chamber 64 is relatively slow, the fuel injected from the fuel injector 5 exists in the area K near the park plug 65 (FIG. 6(c)). As the distribution of the fuel in the area K is not uniform and an air-fuel mixture formed in the area K has an air-fuel ratio of from rich to lean, an air-fuel mixture which has a stoichiometric air-fuel ratio and burns easily exists in the area K. Therefore when an inflammable air-fuel mixture near the spark plug 65 is ignited, combustion of the air-fuel mixture in the area K is progressive (FIG. 6(d)), the combustion gas B expands, and a flame is propagated to burn the air-fuel premixture P.

As mentioned above, when the engine is operating under a medium and high load, a part of a calculate amount of fuel is injected during approximately the first half of the intake stroke to form the air-fuel premixture in the cylinder chamber 64, and a remaining part of the calculated amount of fuel is injected during approximately the latter half of the compression stroke to form the air-fuel mixture in the vicinity of the spark plug 65 for ignition. Accordingly, a good ignition and a good combustion, which fully utilizes the air therein, are obtained.

Especially when all of the calculated amount of fuel is injected during the intake stroke or at an early stage of the compression stroke when the engine is operating under a medium load, as the injected fuel is diffused in the cylinder chamber 64, the air-fuel mixture formed in the cylinder chamber 64 becomes over lean, and thus a problem arises in that ignition and combustion of the air-fuel mixture becomes difficult. On the contrary, when all of the calculated amount of fuel is injected at a late stage of the compression stroke when the engine is operating under a medium load, a problem arises in that much smoke is produced and the full engine power is not obtained because the utilization ratio of the air is low.

Also, under a medium load, the air-fuel ratio of the air-fuel premixture, which is formed by the fuel injected during approximately the first half of the intake stroke, can be leaner than the maximum air-fuel ratio of the air-fuel mixture which can be ignited, and can have an air-fuel ratio of the air-fuel mixture by which flame is propagated, and therefore, the fuel consumption can be reduced due to a leaning burn.

Also, as the injection during the intake stroke and the compression stroke is carried out by the single fuel injector 5, which injects fuel to the vicinity of the spark plug 65, a complicated construction of the engine is not necessary.

If all of the calculated amount of fuel is injected during the compression stroke, when calculated amount of fuel is smaller than $Q_s$, a degree of opening of a throttle valve must be made smaller and an amount of air fed into the cylinder chamber 64 must be reduced, to form an air-fuel mixture which can be ignited and in which a flame can be propagated. When the degree of opening of the throttle valve is made small, however, a problem arises in that the pumping loss is increased. In this embodiment, since all of the calculated amount of fuel is injected during approximately the latter half of the compression stroke when the calculated amount of fuel is smaller than $Q_s$, an amount of air fed into the cylinder chamber 64 need not be reduced, and therefore, an increased pumping loss is prevented.

In this embodiment, the air-fuel mixture can be burnt even when an excess amount of air is fed into the cylinder chamber 64, because of a stratified charge, and therefore, the amount of air fed into the cylinder chamber 64 is not reduced even when the calculated amount of fuel is small. In this embodiment, however, the amount of air fed into the cylinder chamber 64 may be reduced to decrease noise and vibration when the engine is operating in an idling state, and reduce a heat loss of the engine at low temperatures. Namely, note, in this case, as the reduction of the amount of air fed into the cylinder chamber 64 is relatively small, the increase of the pumping loss is small.

Figure 7:
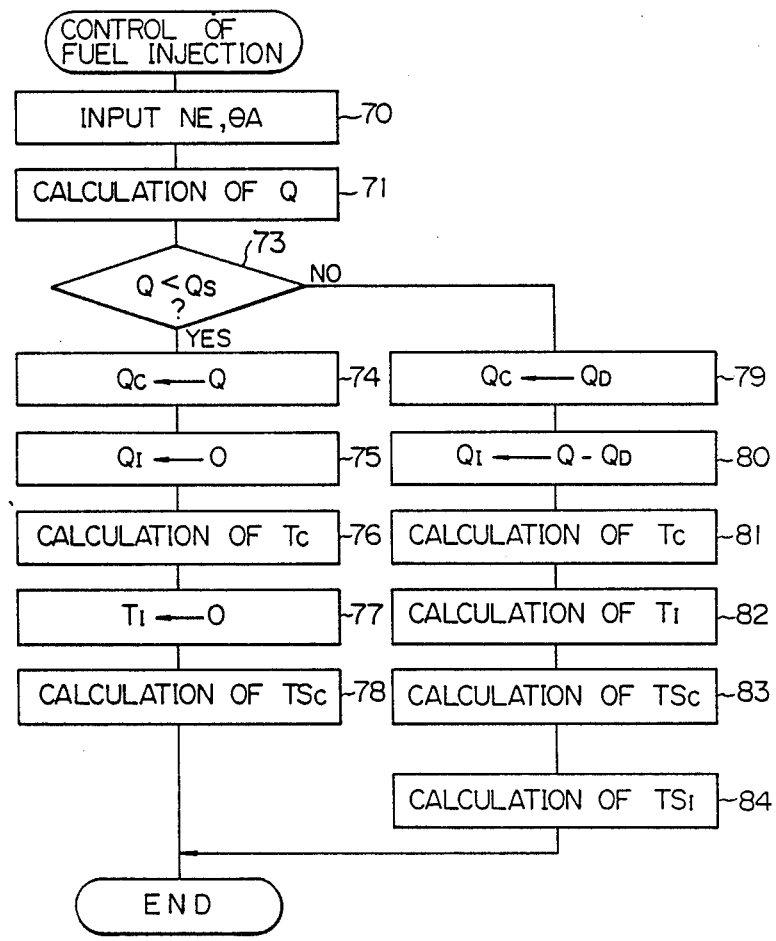
FIG. 7 is a flow chart of the first embodiment for controlling a fuel injection.

FIG. 7 illustrates a routine for controlling the fuel injection. This routine is processed by sequential interruptions executed at predetermined crank angles.

Figure 8:
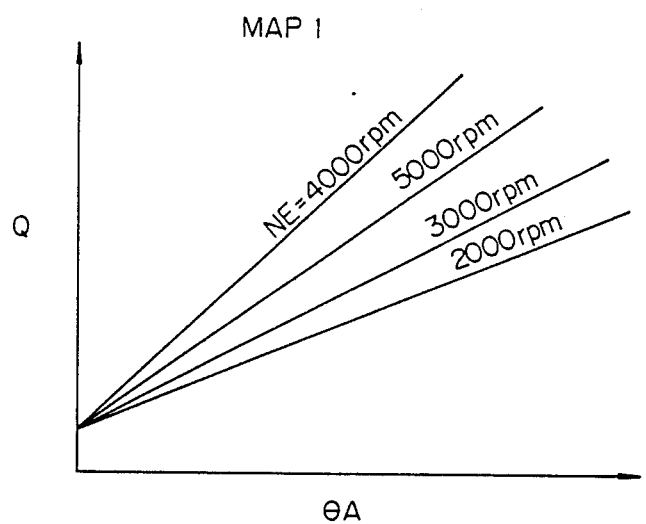
FIG. 8 is a diagram illustrating the relationship among the calculated amount Q of fuel to be injected, the degree of opening $\theta A$ of an accelerator pedal, and an engine speed NE.

Referring to FIG. 7, in step 70, the engine speed NE and the degree of opening $\theta A$ of the accelerator pedal 32 are input to the CPU 24, and in step 71, the calculated amount Q of fuel to be injected is calculated from a map 1 (FIG. 8) on the basis of NE and $\theta A$. Referring to FIG. 8, the calculated amount Q of fuel to be injected is increased in accordance with an increase of the $\theta A$, and reaches a maximum value when the NE is 4000 rpm. The map 1 is prememorized in the ROM 22.

Figure 9:
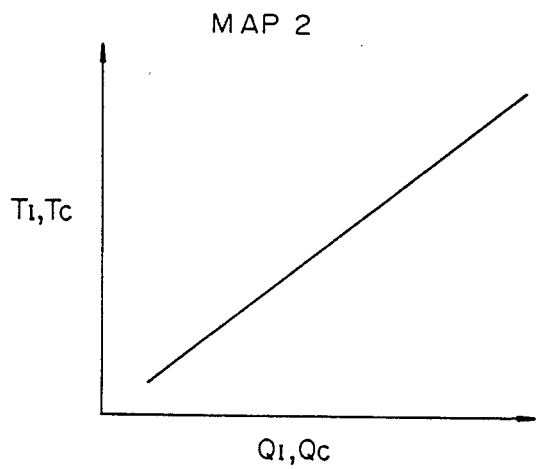
FIG. 9 is a diagram illustrating the relationships between the amount $Q_I$ of fuel to be injected during an intake stroke and the injection time $T_I$ in the intake stroke, and between the amount $Q_c$ of fuel to be injected during a compression stroke and the injection time $T_c$ during the compression stroke.
Figure 10:
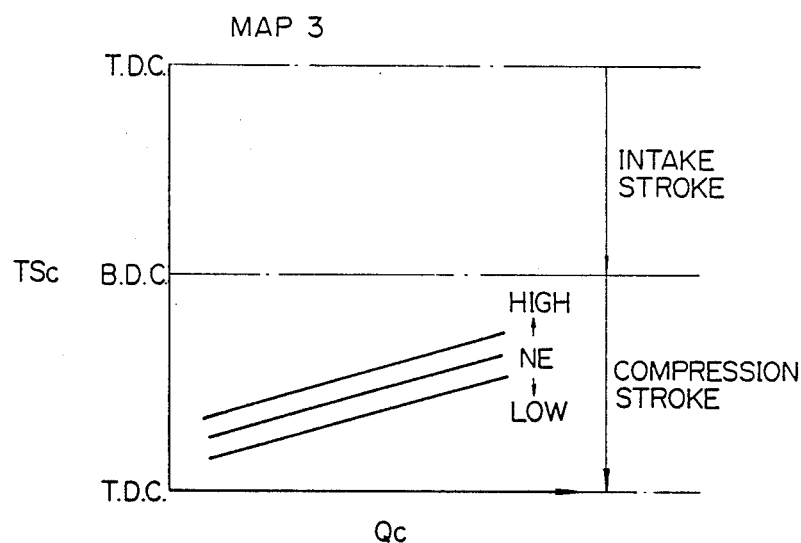
FIG. 10 is a diagram illustrating the relationship among the start timing $TS_c$ of a fuel injection during the compression stroke, the amount $Q_c$ of fuel to be injected during the compression stroke, and the engine speed NE.

Returning to FIG. 7, in step 73 it is determined whether or not Q is smaller than $Q_S$. When $Q<Q_S$, the routine goes to step 74, and the amount $Q_C$ of fuel to be injected during the compression stroke is memorized as the calculated amount Q of fuel to be injected. In step 75, the amount $Q_I$ of fuel to be injected during the intake stroke is memorized as 0, and in step 76, an injection time $T_c$ during the compression stroke is calculated on the basis of $Q_C$. The relationship between $Q_C$ and $T_C$ is shown in FIG. 9 and is prememorized in the ROM 22 as a map 2. The $T_C$ increase in accordance which an increase of $Q_C$ (FIG. 9). In step 77, an injection time $T_I$ during the intake stroke is memorized as 0, and in step 78, a start timing $TS_C$ of a fuel injection during the compression stroke is calculated from a map 3 (FIG. 10) on the basis of $Q_C$ and NE. referring to FIG. 10, the start timing $TS_C$ is advanced in accordance with an increase of $Q_C$ and an increase of NE. The map 3 is prememorized in the ROM 22.

Returning to FIG. 7, when $Q \geq Q_S$, the routine goes to step 79, and the amount $Q_C$ of fuel to be injected during the compression stroke is memorized as $Q_D$ (FIG. 4). In step 80, the amount $Q_I$ of fuel to be injected during the intake stroke is calculated from the following equation $$Q_I = Q - Q_D$$

Accordingly, a sum of the amount $Q_I$ of fuel to be injected during the intake stroke and the amount $Q_D$ of fuel to be injected during the compression stroke is equal to the calculated amount Q of fuel to be injected.

Figure 11:
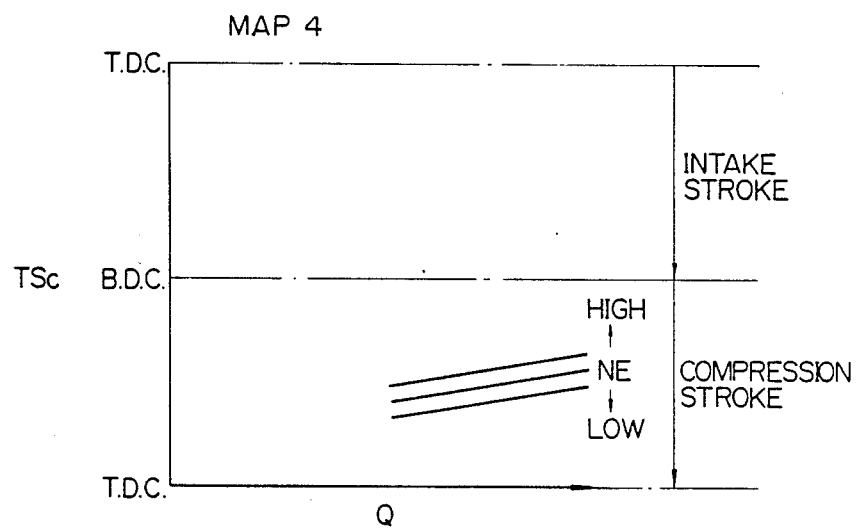
FIG. 11 is a diagram illustrating the relationship among $TS_c$, Q and NE.

In step 81, the injection time $T_C$ during the compression stroke is calculated from the map 2 (FIG. 9), and in step 82, an injection time $T_I$ during the intake stroke is calculated from the map 2 on the basis of $Q_I$. The $T_I$ increases in accordance with an increase of $Q_I$ (FIG. 9). In step 83, the start timing $TS_C$ of a fuel injection during the compression stroke is calculated from a map 4 (FIG. 11) on the basis of Q and NE. Referring to FIG. 11, the start timing $TS_C$ is advanced in accordance with an increase of Q and an increase of NE.

Figure 12:
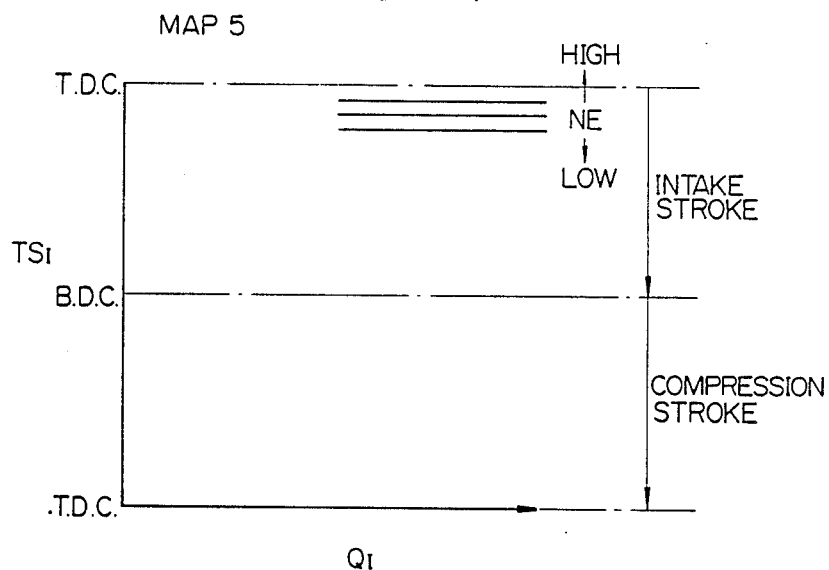
FIG. 12 is a diagram illustrating the relationship among the start timing $TS_I$ of fuel injection during the intake stroke, the amount $Q_I$ of fuel to be injected during the intake stroke, and the engine speed NE.

Returning to FIG. 7, in step 84, a start timing $TS_I$ of a fuel injection during the intake stroke is calculated from a map 5 (FIG. 12) on the basis of NE. Referring to FIG. 11, the start timing $TS_I$ is advanced in accordance with an increase of NE and does not change in accordance with a change of $Q_I$. In the fuel injection during the intake stroke, there is enough time to fully diffuse the injected fuel in the cylinder chamber 64 to form the air-fuel premixture, and therefore, the start timing $TS_I$ need not be advanced in accordance with an increase of $Q_I$.

After the above steps are carried out, this routine is completed and the fuel injection is carried out by another routine (not shown).

Figure 13:
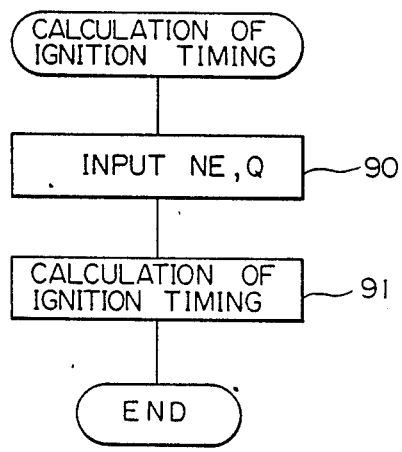
FIG. 13 is a flow chart for calculating an ignition timing.

FIG. 13 illustrates a routine for calculating the ignition timing. This routine is processed by sequential interruptions executed at predetermined crank angles.

Figure 14:
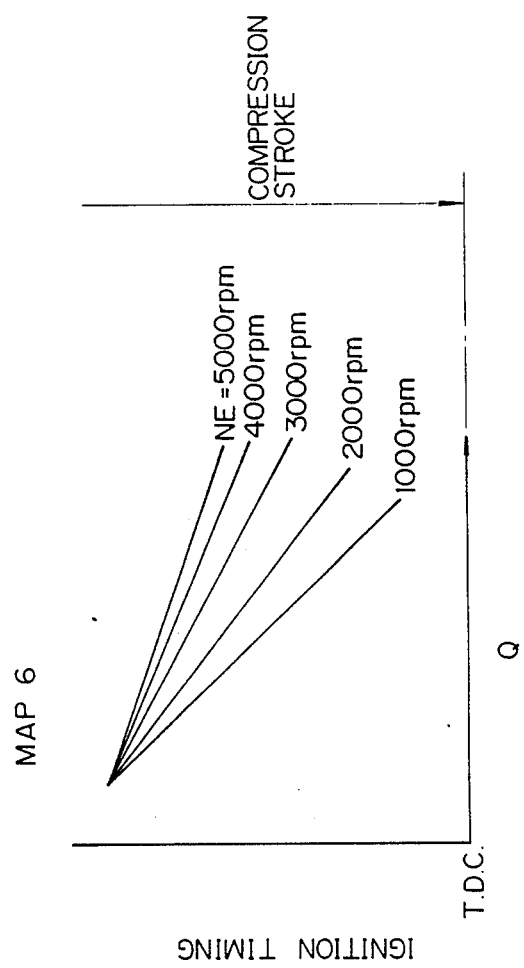
FIG. 14 is a diagram illustrating the relationship among the ignition timing, Q and NE.

Referring to FIG. 13, in step 90, the engine speed NE and the calculated amount Q of fuel to be injected are input to the CPU 24, and in step 91, the ignition timing is calculated from a map 6 (FIG. (14)) on the basis of NE and Q. Referring to FIG. 14, the horizontal axis represents the calculated amount Q of fuel to be injected and the vertical axis represents the ignition timing. The ignition timing is advanced in accordance with a reduction of Q and in accordance with an increase of NE.

A second embodiment of the present invention is now described with reference to FIGS. 15 and 16.

Figure 15:
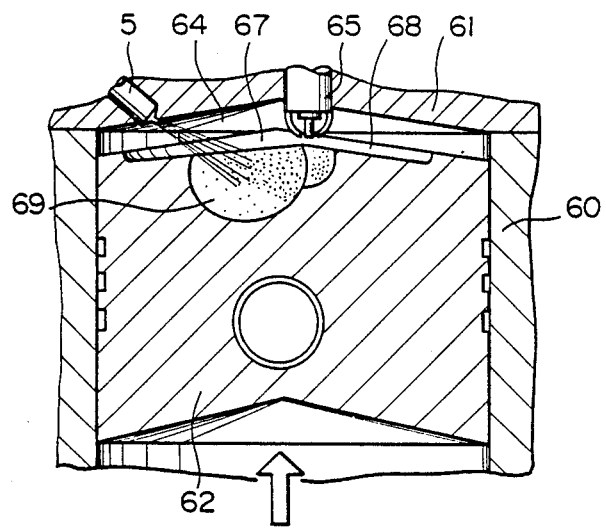
FIG. 15 is a cross-sectional side view of the engine to which a second embodiment of the present invention is applied.

Referring to FIG. 15, a concave combustion chamber 67 formed on the top of the piston 62 comprises a shallow cavity 68 and a deep cavity 69 formed at the approximate center of the shallow cavity, and the shallow cavity 68 has a diameter larger than that of the deep cavity 69. An intake port is formed as a swirl port (not shown) and the fuel injector 5 has a plurality of nozzle openings. Fuel injected from the fuel injector 5 has a small spread angle and the speed of the injected fuel, along the direction of the fuel injection, is relatively fast. The fuel injector 5 is arranged on the top of the cylinder chamber 64, and inclined downward. The direction of the fuel injection and the fuel injection timing of the fuel injector 5 are determined to direct the fuel injected from the fuel injector 5 to the combustion chamber 67. The spark plug 65 is arranged in the combustion chamber 67 when the piston 62 is at TDC. An arrow in FIG. 15 shows a direction of movement of the piston 62. In this embodiment, the control pattern of the fuel injection is the same as that shown in FIG. 4.

Referring to FIG. 4 and FIG. 15, when the calculated amount of fuel to be injected is smaller than $Q_S$, i.e., the engine load is low, all of the calculated amount of fuel to be injected is injected to the combustion chamber 67 during approximately the latter half of the compression stroke (FIG. 5). As the fuel injection timing is delayed most of the fuel is injected into the deep cavity 69. Fuel adhered to the inner wall of the deep cavity 69 is evaporated and becomes a mist, to form an air-fuel mixture in the combustion chamber 67. The air-fuel mixture has an air-fuel ratio of from rich to lean, and therefore, an inflammable air-fuel mixture exists. This air-fuel mixture is ignited by the spark plug 65 and burns best in the deep cavity 69.

When the calculated amount Q of fuel to be injected is equal to or larger than $Q_S$, a part of the calculated amount Q of fuel is injected from the fuel injector 5 to the combustion chamber 67 during approximately the first half of the intake stroke (FIG. 16(a)). The injected fuel F is impinged mainly on the shallow cavity 68, a part of the impinged fuel is reflected to the cylinder chamber 64, and a remaining part of the impinged fuel is adhered to the inner wall of the shallow cavity 68 and then evaporated and becomes mist due to the heat of the inner wall of the shallow cavity 68.

The injected fuel is diffused in the cylinder chamber 64 by a swirl SW and a turbulent flow R so that an air-fuel premixture P is formed in the cylinder chamber 64 (FIG. 16(b)). As in the first embodiment, the air fuel ratio of the air-fuel premixture P is such that a flame can be easily propagated. When a swirl SW is strong, an air-fuel premixture is formed such that the air-fuel ratio of the air-fuel premixture near the inner wall of the cylinder block 60 is rich and the air-fuel ratio of the air-fuel premixture near the center of the cylinder chamber 64 is lean.

Note, when the fuel injection timing is advanced, i.e., fuel is injected when the piston 62 is close to TDC, most of the fuel is injected into the deep cavity 69 and the injected fuel is evaporated mainly in the deep cavity 69.

A remaining part of the calculated amount of fuel is injected from the fuel injector 5 into the deep cavity 69 during approximately the latter half of the compression stroke (FIG. 16(c)). Fuel adhered to the inner wall of the deep cavity 69 is evaporated by heat from the inner wall of the deep cavity 69 and from a compressed gas, and thus an air-fuel mixture is formed in the combustion chamber 67. The air-fuel mixture is nonuniform and has an air-fuel ratio of from rich to lean, and thus an inflammable air-fuel mixture exists. This nonuniform air-fuel mixture is ignited by the spark plug 65 and thus burnt (FIG. 16(d)). The flame B in the deep cavity 69 is propagated to the air-fuel premixture and the combustion is expanded to the outside of the deep cavity 69 by a reverse squish flow.

Note, when a fuel injection during the compression stroke is advanced, i.e., fuel is injected to both the shallow cavity 68 and the deep cavity 69, the flame is distributed over the shallow cavity 68 and the deep cavity 69, and therefore, the propagation of the flame to the air-fuel premixture becomes easier.

FIGS. 17 through 20 illustrates another embodiment wherein the control pattern of the fuel injection is changed.

The third embodiment illustrated in FIG. 16 is the same as the control pattern illustrated in FIG. 4, except that the predetermined second amount of fuel is equal to $Q_H$. $Q_H$ represents a minimum amount of fuel to be injected during the intake stroke, for forming an air-fuel mixture which can be ignited by the spark plug 65 even when the injected fuel is uniformly diffused in the cylinder chamber 64. Accordingly, when the calculated amount of fuel to be injected is equal to or larger than $Q_H$, all of the calculated amount Q of fuel to be injected is injected during the intake stroke.

Figure 17:
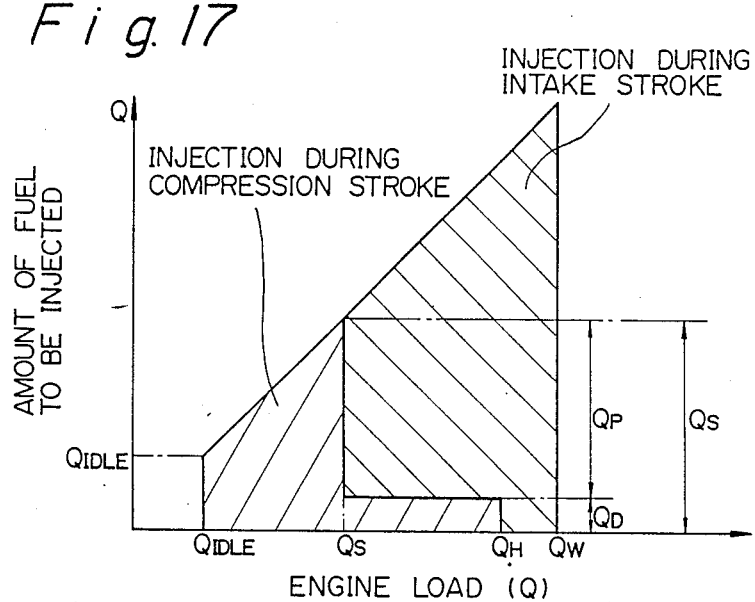
FIG. 17 is a diagram illustrating a control pattern of a fuel injection of a third embodiment of the present invention.
Figure 18:
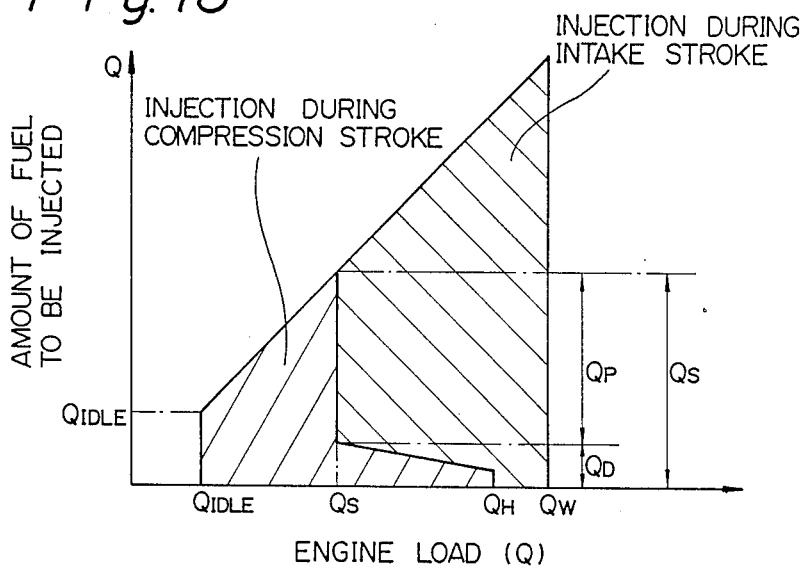
FIG. 18 is a diagram illustrating a control pattern of fuel injection of a fourth embodiment of the present invention.

The fourth embodiment illustrated in FIG. 18 is same as the control pattern illustrated in FIG. 17, except that the amount of fuel to be injected during the compression stroke is gradually reduced when the calculated amount of fuel to be injected changes from $Q_S$ to $Q_H$. Since the air-fuel premixture becomes rich in accordance with an increase of the amount $Q_I$ during the intake stroke, the amount $Q_C$ of fuel to be injected during the compression stroke, which is necessary for a good ignition, can be reduced.

Figure 19:
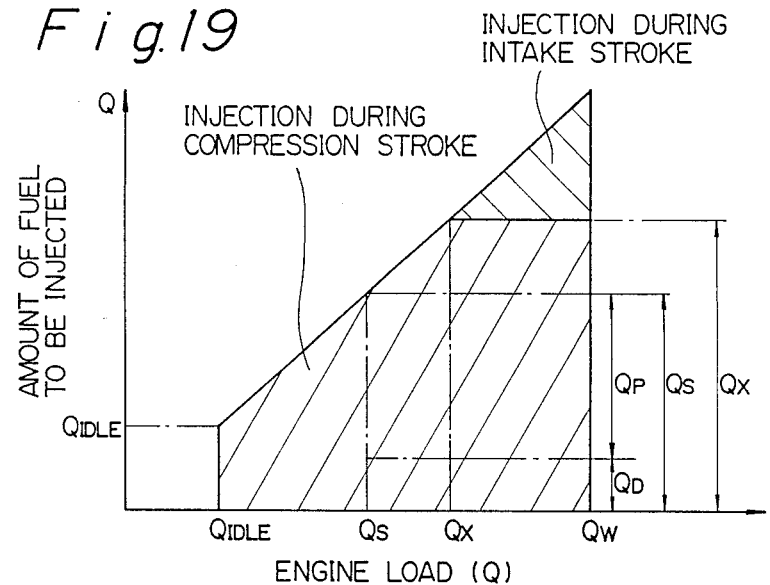
FIG. 19 is a diagram illustrating a control pattern of fuel injection of a fifth embodiment of the present invention.

In the fifth embodiment illustrated in FIG. 19, the predetermined first amount of fuel is equal to $Q_X$, which is larger than $Q_S$, and the predetermined second amount of fuel is equal to $Q_W$. When the calculated amount of fuel is smaller than $Q_X$, all of the calculated amount of fuel is injected during the compression stroke, and when the calculated amount of fuel is equal to or larger than $Q_X$, a constant amount of fuel, for example, $Q_X$ which is a larger part of the calculated amount of fuel, is injected during the compression stroke, and the remaining part of the calculated amount of fuel is injected during the intake stroke. As $Q_X$ is sufficiently larger than $Q_S$, the air-fuel mixture formed by fuel injected during the compression stroke burns well and a good flame is produced, and therefore, the flame can be propagated to the lean air-fuel premixture formed by the fuel injected during the intake stroke.

Figure 20:
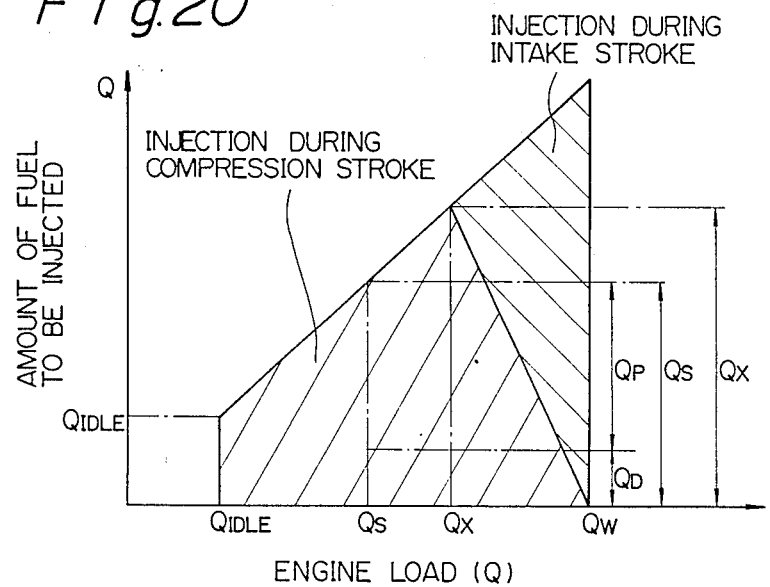
FIG. 20 is a diagram illustrating a control pattern of fuel injection of a sixth embodiment of the present invention.

The sixth embodiment illustrated in FIG. 20 is the same as the fifth embodiment illustrated in FIG. 19, except that the amount of fuel to be injected during the compression stroke is gradually reduced from $Q_X$ to 0 when the calculated amount of fuel to be injected charges from $Q_X$ to $Q_W$. When the calculated amount of fuel is equal to $Q_W$, all of the calculated amount of fuel is injected during the intake stroke. Since the air-fuel premixture becomes rich in accordance with an increase of the amount $Q_I$ during the intake stroke, the flame is easily propagated, and therefore, the amount $Q_C$ of fuel to be injected during the compression stroke, which is necessary for a good ignition, can be reduced.

A seventh embodiment of the present invention is now described. In this seventh embodiment, an injection ratio C of the amount $Q_I$ of fuel injected during the intake stroke to the amount $Q_C$ of fuel injected during the compression stroke is changed in accordance with the engine operating state, when both the fuel injection during the intake stroke and the fuel injection during the compression stroke are carried out.

When the engine is operating in a stationary state where the calculated amount of fuel to be injected is approximately constant, the temperature in the cylinder chamber 64 is an approximately constant temperature determined by the amount of fuel to be injected. When the engine is operating in a stationary state, the greater the increase in the amount of fuel to be injected, the higher the temperature in the cylinder chamber 64. In a transient engine operating state, however, i.e., when the engine load changes, the temperature in the cylinder chamber 64 can not follow the change of the engine load, i.e., the change of the amount Q of fuel to be injected, and therefore, a problem arises in that a transient characteristic of the engine is poor. For example, when the amount Q of fuel to be injected is reduced (a reduction operating state) after the stationary operation, the temperature in the cylinder chamber 64 can not follow the reduction of the amount Q of fuel to be injected, and therefore, the temperature in the cylinder chamber 64 transiently becomes higher than a stationary temperature in the cylinder chamber 64 in a stationary engine operating state which corresponds to the reduced amount of fuel to be injected. Accordingly, the evaporation of the fuel adhered to the inner wall of the combustion chamber 67 becomes faster, and thus the forming of the air-fuel mixture is quicker. Consequently, as the time from the forming of the air-fuel mixture to the time of ignition. is prolonged, the air-fuel mixture is diffused by the air flow before the ignition occurs and an overlean area is produced in the air-fuel mixture, and thus the combustion of the air-fuel mixture becomes unstable.

Especially, when the engine load is reduced and an air-fuel ratio becomes equal to the stoichiometric air-fuel ratio after the engine is operating in a stationary state where the air-fuel mixture has a rich air-fuel ratio, for obtaining a high power, since the easily-ignitable air-fuel mixture is formed early, knocking occurs.

On the other hand, for example, when the amount of fuel to be injected is increased (an increase operating state) after the stationary operation, the temperature in the cylinder chamber 64 can not follow the increase of the amount of fuel to be injected, and therefore, the temperature in the cylinder chamber 64 transiently becomes lower than a stationary temperature in the cylinder chamber 64 in a stationary engine operating state which corresponds to the increased amount of fuel to be injected. Accordingly, the fuel adhered to the inner wall of the combustion chamber 67 is not fully evaporated and thus an over-rich area is produced in the air-fuel mixture, and therefore, a problem arises in that smoke is produced and the engine power is reduced.

In this embodiment, the transient characteristic of the engine can be improved when both the fuel injection during the intake stroke and the fuel injection during the compression stroke are carried out.

Figure 21A:
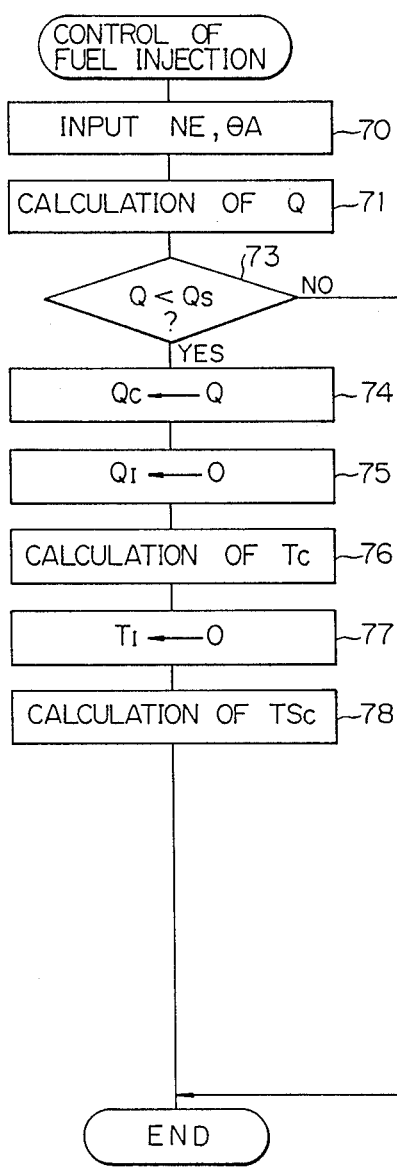
Figure 21B:
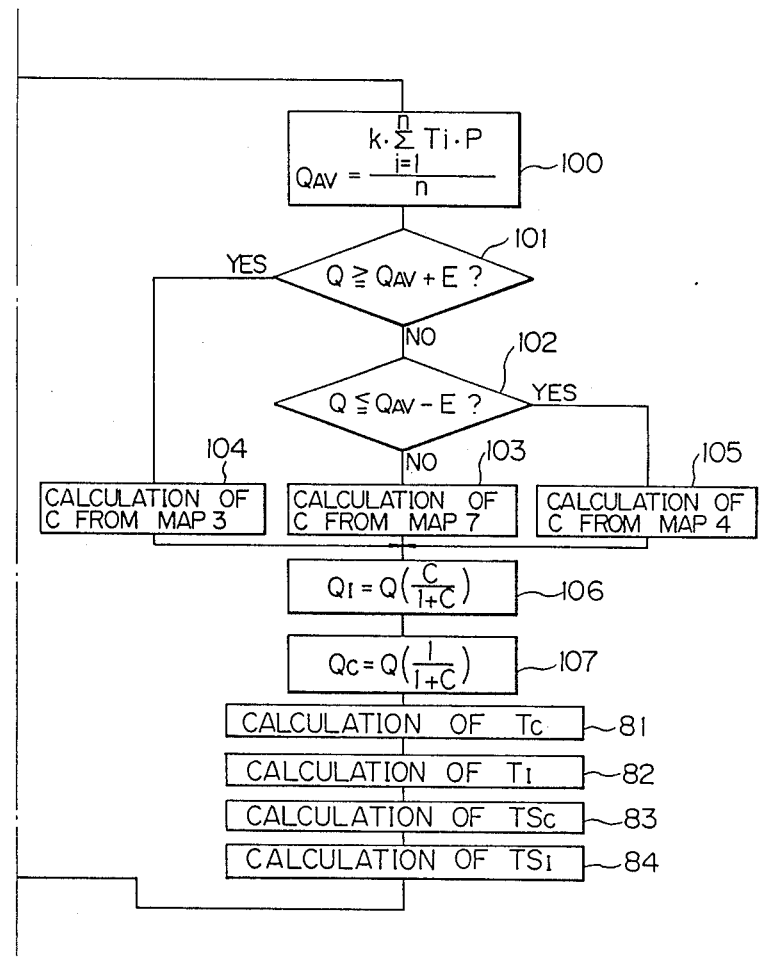

FIG. 21 illustrates a routine for controlling the fuel injection. This routine is processed by sequential interruptions executed at predetermined crank angles. In FIG. 21, similar steps are indicated by the same step numbers as used in FIG. 7, and a description of these similar steps is therefore omitted.

Referring to FIG. 21, in step 73, when the calculated amount Q of fuel is equal to or larger than $Q_s$, the routine goes to step 100, and an average amount $Q_{AV}$ of fuel to be injected is calculated from the following equation.

$$Q_{AV} = \frac{k \cdot \sum_{i=1}^{n} T_i \cdot P}{n}$$

Where $T_i$: an injection time in the i-th fuel injection $P$: a fuel pressure $k$: a coefficient for converting $T_i \cdot P$ to the amount of fuel to be injected Accordingly, the average amount $Q_{AV}$ of fuel to be injected represents an average amount of fuel to be injected for n times fuel injections, and is assumed to be an amount of fuel to be injected during the stable engine operating state. In step 101, it is determined whether or not the calculated amount Q of fuel to be injected is equal to or larger than $Q_{AV}+E$, and in step 102, it is determined whether or not the calculated amount Q of fuel to be injected is equal to or smaller than $Q_{AV}-E$. Where E is a constant value and a standard value ($Q_{AV}$) has a width of a constant value (2·E). Therefore, a frequent repetition of alternate determinations of a increase a reduction and a stable operating state is prevented. Also, in a moderate increase condition or a moderate reduction of an engine load, as the temperature in the cylinder chamber can follow the change of the amount of fuel to be injected relatively well the injection ratio C need not be changed. Accordingly, the constant value E is determined to correspond to the change of the amount of fuel to be injected in the moderate increase state, and the moderate reduction of an engine load. The injection ratio C is represented by the following equation.

$$C = \frac{Q_I}{Q_C}$$

Where $Q_I$: an amount of fuel to be injected during the intake stroke $Q_C$: an amount of fuel to be injected during the compression stroke When $Q_{AV}-E<Q<Q_{AV}+E$, it is determined that the engine operating state is stable and the routine goes to step 103. In step 103, the injection ratio C is calculated from a map 7 (FIG. 22) on the basis of the calculated amount Q of fuel to be injected.

Figure 22:
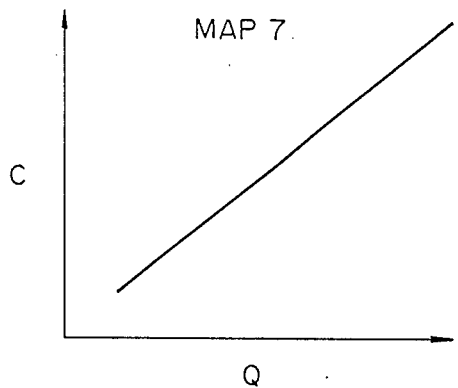
FIG. 22 is a diagram illustrating the relationship between an injection ratio C and the calculated amount Q of fuel to be injected in a stable engine operating state.

FIG. 22 illustrates the relationship between the calculated amount Q of fuel to be injected and the injection ratio C in a stable engine operating state, and the relationship is prememorized in the ROM 22 (FIG. 1). The injection ratio C is linearly increased in accordance with an increase of the calculated amount Q of fuel to be injected. Namely, the ratio of the amount $Q_I$ of fuel to be injected during the intake stroke to the calculated amount Q of fuel to be injected is increased in accordance with the increase of Q.

In step 101, when $Q \geq Q_{AV}+E$, it is determined that the engine load is increasing and the routine goes to step 104. In step 104, the injection ratio C is calculated from a map 8 (FIG. 23).

Figure 23:
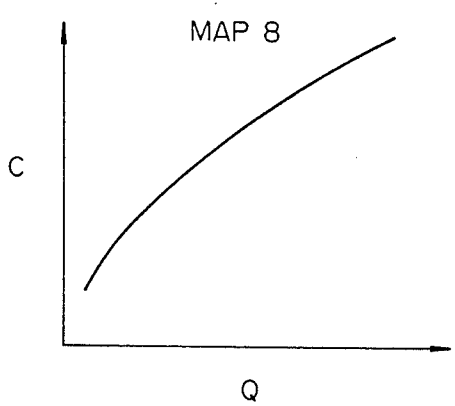
FIG. 23 is a diagram illustrating the relationship between C and Q when the operating load is increased; and, FIG. 24 is a diagram illustrating the relationship between C and Q when the operating load is reduced.

FIG. 23 illustrates a relationship between the calculated amount Q of fuel to be injected and the injection ratio C in an increase operating state, and the relationship is prememorized in the ROM 22 (FIG. 1). The injection ratio C is increased along the upwardly convexed curve in accordance with an increase of Q. The injection ratio C corresponding to a predetermined value of Q in the map 8 is always larger than the injection ratio C corresponding to a value which is the same as the predetermined value of Q in the map 7 (FIG. 22).

Namely, in the increase operating state, the amount $Q_I$ of fuel injected during the intake stroke becomes larger than that in the stable engine operating state. As a period from an injection timing during approximately the first half of the intake stroke to an ignition timing is relatively long, fuel injected during approximately the first half of the intake stroke can be fully evaporated. Accordingly when engine is operating in the increase operating state, as the amount $Q_I$ of fuel injected during the intake stroke is made larger than that in the stable engine operating state, the injected fuel can be fully evaporated, and thus a good air-fuel mixture is formed, and consequently a good combustion can be obtained.

In step 102, when $Q \leq Q_{AV}-E$, it is determined that the engine is operating in a reduction operating state and the routine goes to step 105. In step 105, the injection ratio C is calculated from a map 9 (FIG. 24).

Figure 24:
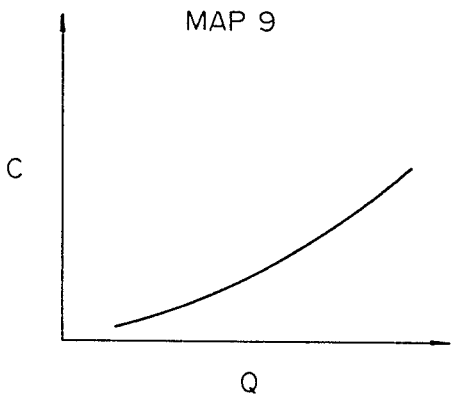

FIG. 24 illustrates a relationship between the calculated amount Q of fuel to be injected and the injection ratio C in the reduction operating state, and the relationship is prememorized in the ROM 22 (FIG. 1). The injection ratio C is increased along the downwardly convexed curve in accordance with an increase of Q. The injection ratio C corresponding to a predetermined value of Q in the map 9 is always smaller than the injection ratio C corresponding to the value which is the same as the predetermined value of Q in the map 7 (FIG. 22). Namely, in the reduction operating state, the amount $Q_I$ of fuel injected during the intake stroke becomes smaller than that in the stable engine operating state. Therefore, the air-fuel mixture is not more quickly formed and thus an unstable combustion and knocking can be prevented.

In step 106, the amount $Q_I$ of fuel to be injected during the intake stroke is calculated from the following equation.

$$Q_I = Q\left(\frac{c}{1+c}\right)$$

In step 107, the amount $Q_C$ of fuel to be injected during the intake stroke is calculated from the following equation.

$$Q_I = Q\left(\frac{c}{1+c}\right)$$

In step 81 through 84, $T_C$, $T_I$, $TS_C$ and TSI are calculated.

Note the value of E may be small. In this case, the difference between the injection ratio C in the map 7 and the injection ratio C in the map 8 or between the injection ratio C in the map 7 and the injection ratio C in the map 9 may be increased in accordance with an increase of the difference between Q and $Q_{AV}$.

Also, when it is determined that the engine is operating in a transient state in step 101 or step 102, the injection ratio C may be calculated from the map 3 or 4 during a predetermined time from the determination of a transient state.

Also the determination of the increase operating state, the reduction operating state, or a stable operating state may be made on the basis of the degree of opening $\theta A$ of the accelerator pedal 32.

Still further, in FIG. 21, either steps 101 and 104, or steps 102 and 105 may be deleted.

While the invention has been described with reference to specific embodiments chosen for purposes of illustration, it should be apparent that numerous modifications could be made thereto by those skilled in the art without departing from the basic concept and scope of the invention.

We claim:

1. An internal combustion engine having a piston introduced into a cylinder and a spark plug arranged in a cylinder head, said engine comprising:
 a fuel injector for injecting fuel directly into the cylinder;
 detecting means for detecting an engine operating state;
 calculating means for calculating a calculated amount of fuel to be injected on the basis of said engine operating state detected by said detecting means; and
 a control means for controlling said fuel injector to inject all of said calculated amount of fuel during a compression stroke when said calculated amount of fuel is smaller than a predetermined first amount of fuel, inject a part of said calculated amount of fuel during approximately a first half of an intake stroke, and inject a remaining part of said calculated amount of fuel during a compression stroke when said calculated amount of fuel is equal to or larger than said predetermined first amount of fuel and smaller than a predetermined second amount of fuel which is larger than said predetermined first amount of fuel.

2. An internal combustion engine according to claim 1, wherein said predetermined first amount of fuel is equal to an amount of fuel which is a sum of a first minimum amount of fuel to be injected during the compression stroke for forming an air-fuel mixture which can be ignited by the spark plug and a second minimum amount of fuel to be injected during the intake stroke for forming an air-fuel mixture in which a flame can be propagated even when said injected fuel is uniformly diffused in the cylinder.

3. An internal combustion engine according to claim 2, wherein said first minimum amount of fuel is smaller than an idling amount of fuel to be injected for engine idling.

4. An internal combustion engine according to claim 2, wherein said remaining part of said calculated amount of fuel is equal to said first minimum amount of fuel.

5. An internal combustion engine according to claim 1, wherein said predetermined second amount of fuel is equal to an amount of fuel to be injected when the engine is under a maximum load.

6. An internal combustion engine according to claim 1, wherein said predetermined second amount of fuel is smaller than an amount of fuel to be injected when the engine is under maximum load.

7. An internal combustion engine according to claim 6, wherein said predetermined second amount of fuel is equal to a third minimum amount of fuel to be injected during the intake stroke for forming an air-fuel mixture which can be ignited by the spark plug even when the injected fuel is uniformly diffused in the cylinder.

8. An internal combustion engine according to claim 7, wherein all of said calculated amount of fuel is injected during intake stroke when said calculated amount of fuel is equal to or larger than said third minimum amount of fuel.

9. An internal combustion engine according to claim 1, wherein said remaining part of said calculated amount of fuel is always a constant amount.

10. An internal combustion engine according to claim 1, wherein said remaining part of said calculated amount of fuel is reduced in accordance with an increase of said calculated amount of fuel.

11. An internal combustion engine according to claim 10, wherein said remaining part of said calculated amount of fuel is reduced from said predetermined first amount of fuel to 0 in accordance with an increase of said calculated amount of fuel from said predetermined first amount of fuel to said predetermined second amount of fuel.

12. An internal combustion engine according to claim 1, wherein said part of said calculated amount of fuel is increased in accordance with an increase of said calculated amount of fuel.

13. An internal combustion engine according to claim 1, wherein said predetermined first amount of fuel is larger than an amount of fuel which is a sum of a first minimum amount of fuel to the injected during the compression stroke for forming an air-fuel mixture which can be ignited by the spark plug and a second minimum amount of fuel to be injected during the intake stroke for forming an air-fuel mixture in which a flame can be propagated even when injected fuel is uniformly diffused in the cylinder.

14. An internal combustion engine according to claim 13, wherein said remaining part of said calculated amount of fuel is equal to said predetermined first amount of fuel.

15. An internal combustion engine according to claim 1, wherein only one fuel injector is arranged in the cylinder.

16. An internal combustion engine according to claim 15, wherein the spark plug is arranged at an approximate center of the cylinder and said fuel injector is inclined downward, injected fuel from said fuel injector being directed to a vicinity of the spark plug.

17. An internal combustion engine according to claim 16, wherein said fuel injector is a swirl type injector.

18. An internal combustion engine according to claim 1, wherein a concave cavity is formed at the top of the piston.

19. An internal combustion engine according to claim 18, wherein said fuel injector injects fuel toward said concave cavity.

20. An internal combustion engine according to claim 18, wherein said concave cavity comprises a shallow cavity and a deep cavity formed at an approximate center of said shallow cavity.

21. An internal combustion engine according to claim 1, wherein the fuel injection during the compression stroke is carried out during approximately a latter half of the compression stroke.

22. An internal combustion engine according to claim 21, wherein said fuel injector is inclined downward and injected fuel does not directly impinge an inner face of the cylinder.

23. An internal combustion engine according to claim 1, wherein a start timing of the fuel injection during the compression stroke in advanced in accordance with an increase of said calculated amount of fuel to be injected and an engine speed.

24. An internal combustion engine according to claim 1, wherein a start timing of the fuel injection during the intake stroke is advanced in accordance with only an increase in an engine speed.

25. An internal combustion engine according to claim 1, wherein when said calculated amount of fuel to be injected is changed, a ratio of said part of said calculated amount of fuel to said remaining part of said calculated amount of fuel is made different from the ratio in a stationary operating state wherein said calculated amount of fuel to be injected is approximately constant and equal to a changed calculated amount of fuel to be injected.

26. An internal combustion engine according to claim 25, wherein when said calculated amount of fuel to be injected is increased, said ratio is made larger than said ratio in a stationary operating state.

27. An internal combustion engine according to claim 25, wherein when said calculated amount of fuel to be injected is reduced, said ratio is made smaller than said ratio in a stationary operating state.

28. An internal combustion engine according to claim 25, wherein said ratio is increased in accordance with an increase of said calculated amount of fuel to be injected.

29. An internal combustion engine according to claim 25, wherein it is determined that said calculated amount of fuel to be injected is changed when a difference between said calculated amount of fuel to be injected and a stationary amount of fuel to be injected in a stationary operating state is larger than a predetermined value.

30. An internal combustion engine according to claim 29, wherein said stationary amount of fuel is an average of sequential calculations of said calculated amount of fuel to be injected.

31. An internal combustion engine according to claim 1, wherein said detecting means detects an engine speed and a degree of opening of an accelerator pedal.

* * * * *

UNITED STATES PATENT AND TRADEMARK OFFICE
CERTIFICATE OF CORRECTION

PATENT NO. : 4,955,339
DATED : September 11, 1990
INVENTOR(S) : S. Sasaki, et al.

It is certified that error appears in the above-identified patent and that said Letters Patent is hereby corrected as shown below:

ABSTRACT, line 12, after "than" insert --the predetermined first amount of fuel and smaller than--.

Column 6, line 18, change "park" to --spark--.

Column 6, line 29, change "calculate" to --calculated--.

Column 6, line 60, change "leaning" to --lean--.

Column 7, line 52, change "referring" to --Referring--.

Column 7, line 66, change "$Q_D$" to --$Q_C$--.

Column 9, line 55, change "illustrates" to --illustrate--.

Column 11, lines 66 and 67, change "$Q_{AV}$-E. Where" to --$Q_{AV}$-E, where--.

Column 12, line 1, change "a" to --an--.

UNITED STATES PATENT AND TRADEMARK OFFICE
CERTIFICATE OF CORRECTION

PATENT NO. : 4,955,339

DATED : September 11, 1990

INVENTOR(S) : S. Sasaki, et al.

It is certified that error appears in the above-identified patent and that said Letters Patent is hereby corrected as shown below:

Column 12, line 2, should read --crease in operating state, a reduction in operating state--.

Column 15, line 6, change "to the" to --to be--.

Column 16, line 5, change "in" to --is--.

Signed and Sealed this

Twenty-eighth Day of April, 1992

Attest:

HARRY F. MANBECK, JR.

*Attesting Officer*  *Commissioner of Patents and Trademarks*